(12) United States Patent
Shimano et al.

(10) Patent No.: US 9,121,449 B2
(45) Date of Patent: Sep. 1, 2015

(54) SLIDE BEARING

(75) Inventors: Kenichi Shimano, Yokohama (JP);
Kazunori Ikeda, Yokohama (JP);
Yoshiaki Takada, Kawasaki (JP);
Hiroshi Yagisawa, Kamakura (JP);
Takayuki Shimmyo, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/438,320

(22) Filed: Apr. 3, 2012

(65) Prior Publication Data

US 2012/0257848 A1    Oct. 11, 2012

(30) Foreign Application Priority Data

Apr. 5, 2011  (JP) ................................ P2011-083974

(51) Int. Cl.
*F16C 33/10*    (2006.01)
*F16C 17/02*    (2006.01)

(52) U.S. Cl.
CPC ............. *F16C 33/1025* (2013.01); *F16C 17/02* (2013.01); *F16C 33/10* (2013.01); *F16C 33/1065* (2013.01); *F16N 2210/14* (2013.01)

(58) Field of Classification Search
CPC ........ F16C 17/02; F16C 17/022; F16C 33/10; F16C 33/1025; F16C 33/106; F16C 33/1065
USPC .......................... 384/288, 322, 398–400, 415
See application file for complete search history.

(56) References Cited

U.S. PATENT DOCUMENTS

| 3,017,229 | A | * | 1/1962 | Dilworth | 384/288 |
| 4,152,032 | A | * | 5/1979 | Pierpoline et al. | 384/131 |
| 4,345,797 | A | * | 8/1982 | Ballheimer | 384/397 |
| 5,493,952 | A | * | 2/1996 | Daniel et al. | 92/72 |

FOREIGN PATENT DOCUMENTS

| EP | 2103823 | 9/2009 |
| JP | 52-094954 | 8/1977 |
| JP | 54-084454 | 7/1979 |
| JP | 57-089023 | 6/1982 |
| JP | 58-177621 | 11/1983 |
| JP | 2009-222210 | 10/2009 |

OTHER PUBLICATIONS

Office Action issued on Sep. 9, 2014 in Japanese Patent Application No. 2011-083974 w/partial English translation.

* cited by examiner

*Primary Examiner* — Richard W Ridley
*Assistant Examiner* — Brian McGovern
(74) *Attorney, Agent, or Firm* — Oblon, McClelland, Maier & Neustadt, L.L.P.

(57) ABSTRACT

A slide bearing has an oil supply passage formed in a lower bearing portion, that supplies lubricating oil into clearance between an outer peripheral surface of a rotating shaft and lower and upper slide surfaces, and an oil discharge passage formed in the lower half bearing portion and discharges the lubricating oil from the clearance. The oil supply passage has a downstream portion and the oil discharge passage has an upstream portion which is provided at positions on opposite sides of the rotating shaft. The oil supply passage has an upstream portion extending toward the upstream portion of the oil discharge passage, and the oil discharge passage has a downstream portion extending toward the downstream portion of the oil supply passage.

2 Claims, 10 Drawing Sheets

SLIDE BEARING

BACKGROUND OF THE INVENTION

1. Field of the Invention

The present invention relates to a slide bearing which supports a rotating shaft of a rotating machine such as a steam turbine by oil film pressure of lubricating oil.

2. Description of the Related Art

Figure 9:
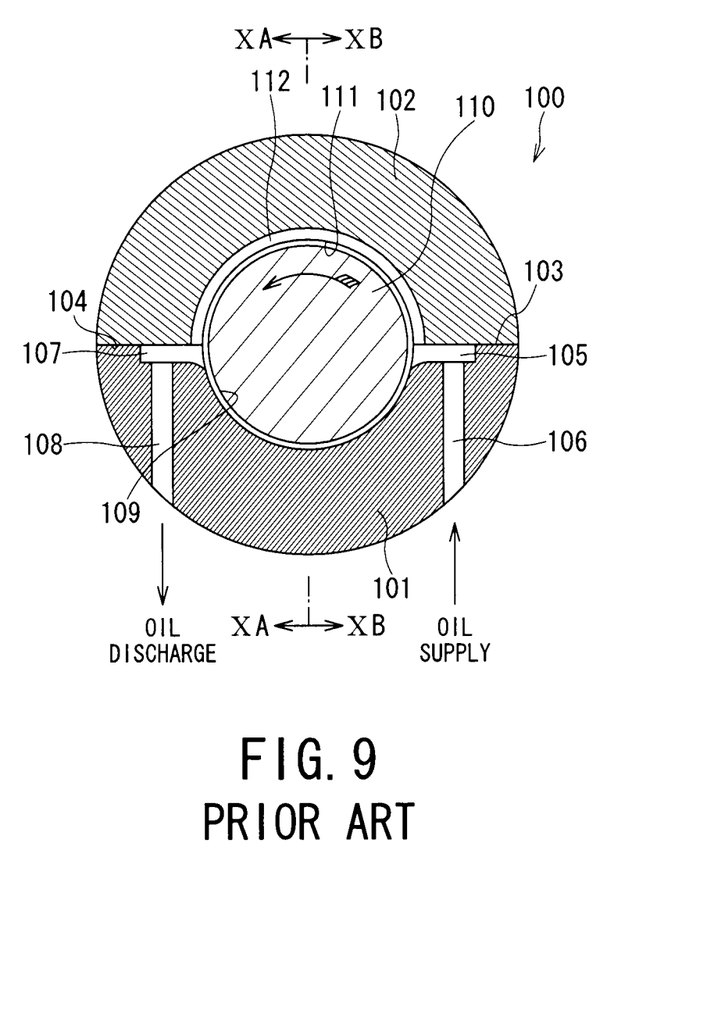
FIG. 9 is a cross-sectional view showing a conventional slide bearing.
Figure 10A:
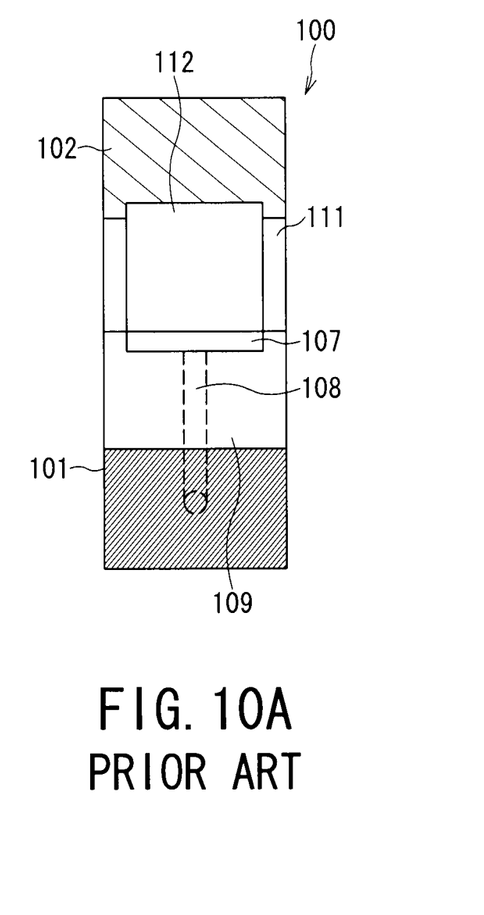
FIGS. 10A and 10B are cross-sectional views taken along the line XA-XA and line XB-XB in FIG. 9, respectively.
Figure 10B:
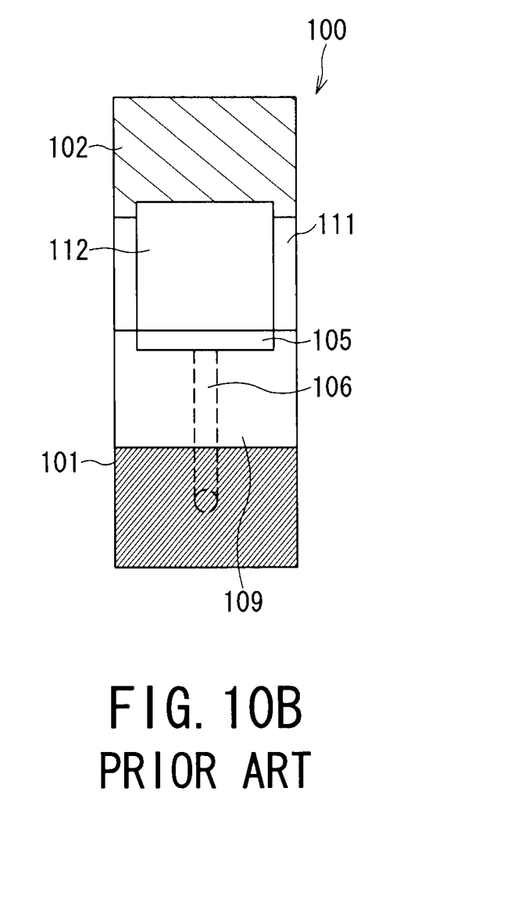

A slide bearing 100 as shown in FIG. 9 and FIGS. 10A and 10B is used in a rotating machine such as a steam turbine or a power generator to support a load of a rotating shaft. The slide bearing 100 includes a lower half bearing portion 101 and an upper half bearing portion 102, which can be joined together or split apart at an upper end face 103 of the lower half bearing portion 101 and a lower end face 104 of the upper half bearing portion 102.

The lower half bearing portion 101 has an oil supply groove 105 and an oil discharge groove 107 formed in the upper end face 103. When the rotating machine is in operation, lubricating oil is supplied to the oil supply groove 105 through an oil supply hole 106. The lubricating oil then spreads in an axial direction at the oil supply groove 105 and flows into clearance or gap between a rotating shaft 110 and an inner peripheral surface 109 of the lower half bearing portion 101.

Oil film pressure is created in the lubricating oil flowing into the clearance so as to support a load of the rotating shaft 110.

As the rotating shaft 110 rotates, the lubricating oil flows onto an inner peripheral surface 111 of the upper half bearing portion 102. Part of the lubricating oil passes through the oil discharge groove 107 and an oil discharge hole 108 and is discharged outside the slide bearing 100. The upper half bearing portion 102 has an overshot groove 112 formed in a part of the inner peripheral surface 111 in an axial direction. The overshot groove 112 is formed so as to intentionally increase clearance between the rotating shaft 110 and the inner peripheral surface 111 of the upper half bearing portion 102 so as to reduce friction losses caused by viscosity of the lubricating oil.

Figure 11:
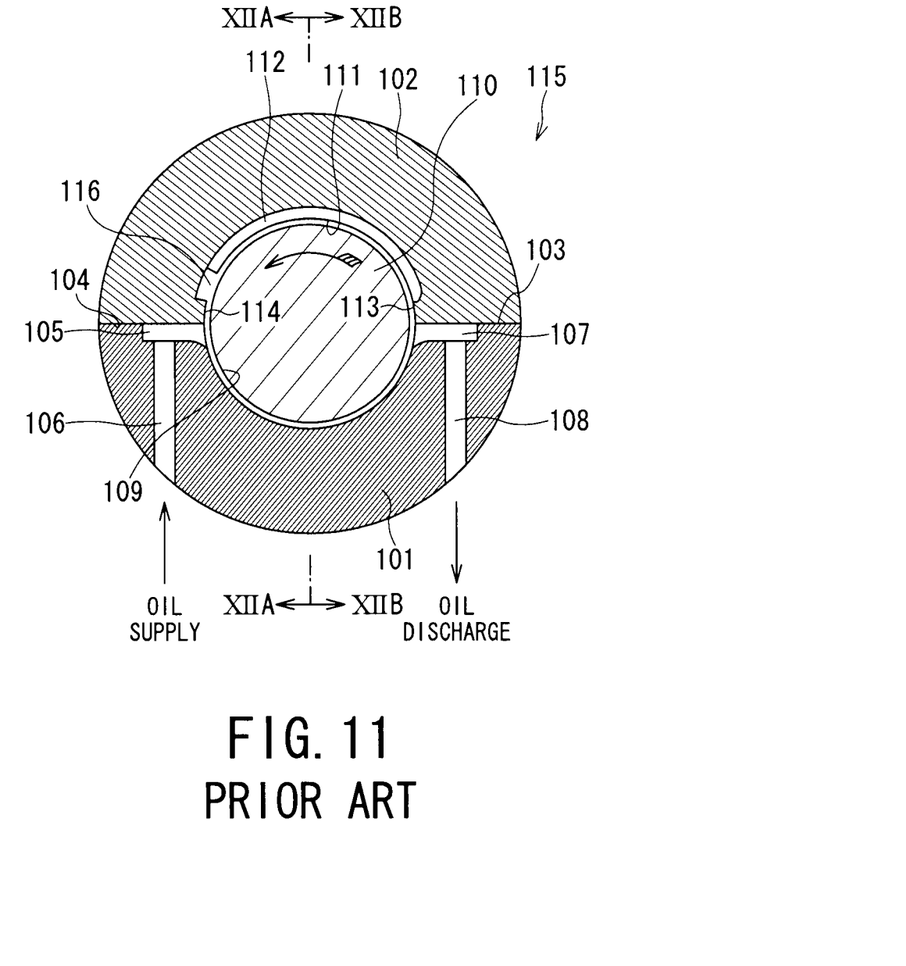
FIG. 11 is a cross-sectional view showing another conventional slide bearing.
Figure 12A:
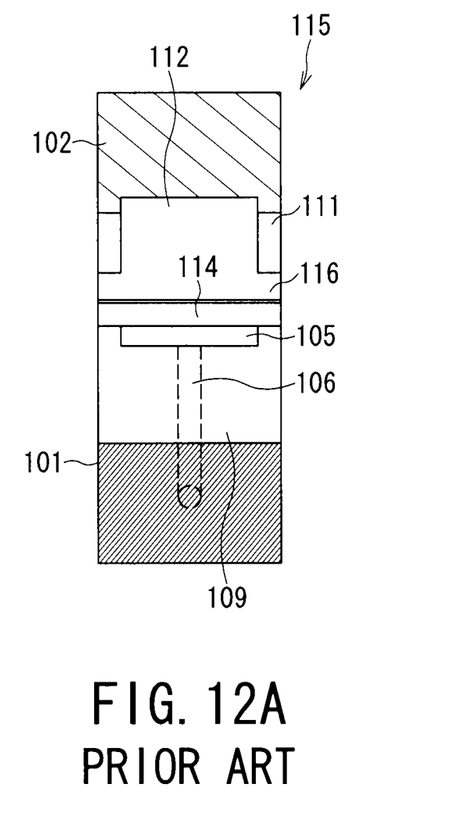
FIGS. 12A and 12B are cross-sectional views taken along the line XIIA-XIIA and line XIIB-XIIB in FIG. 11, respectively.
Figure 12B:
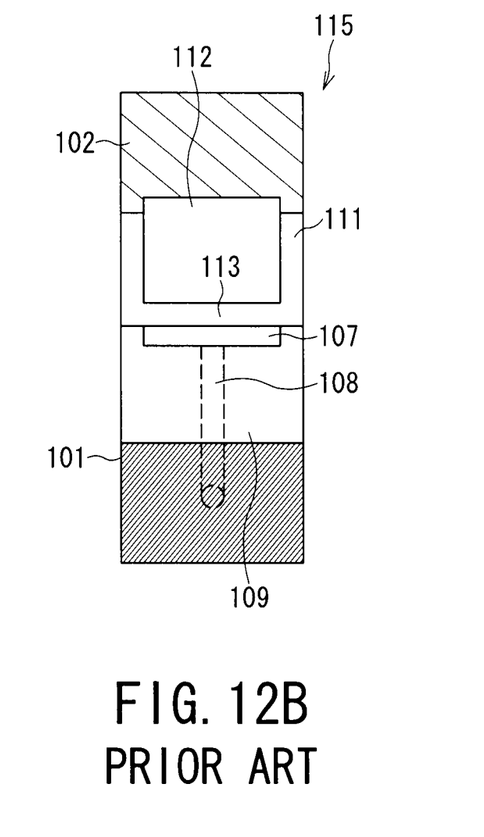

As shown in FIGS. 11 and 12, there has recently been proposed a slide bearing 115 which is obtained by reversing directions of oil supply and oil discharge by reversing positions of the oil supply hole 106 and oil discharge hole 108 and positions of the oil supply groove 105 and oil discharge groove 107 of the slide bearing 100, and additionally forming weirs 113 and 114 at portions of the inner peripheral surface 111 of the upper half bearing portion 102 that are left in front of and behind the overshot groove 112 such as disclosed in Patent Document 1 (Japanese Utility Model Laid-Open Publication No. 58-177621).

Clearance between the weirs 113 and 114 and the rotating shaft 110 is about 0.1 to 1 mm, which is smaller than depth of the overshot groove 112. For this reason, fluid resistance is produced at surfaces of the weirs 113 and 114. The amount of the lubricating oil flowing from the oil discharge groove 107 or oil supply groove 105 into the overshot groove 112 is smaller than that in the slide bearing 100 without forming the weirs 113 and 114.

As described above, according to such arrangement, the amount of the lubricating oil flowing into the overshot groove 112 upon rotation of the rotating shaft 110 can be reduced by reversing the directions of oil supply and oil discharge and providing the weirs 113 and 114. Therefore, since the lubricating oil can be prevented from remaining in the overshot groove 112, a reduction in friction losses caused by viscosity of the lubricating oil can be ensured.

Additionally, an discharge port 116 which causes the overshot groove 112 to communicate with an outside of the slide bearing 115 may be provided at a position rotationally upstream of the weir 114 on the slide bearing 115 side. In such case, a part of lubricating oil, having passed through the overshot groove 112 and risen in temperature, is stemmed by the weir 114 on the oil supply groove 105 side and is discharged outside the slide bearing 115 through the discharge port 116. Consequently, temperature of the lubricating oil flowing onto the inner peripheral surface 109 of the lower half bearing portion 101 can be kept low.

The slide bearing 100 shown in FIG. 9 and FIGS. 10A and 10B has been widely used for a conventional steam turbine generator of a steam power plant. In accordance with a recent increase in performance and output of steam turbines, the rotating shaft 110 heavy in weight must be sometimes adopted. In this case, the required amount of lubricating oil supplied to the slide bearing 100 tends to be large.

In contrast, the slide bearing 115 shown in FIG. 11 and FIGS. 12A and 12B can control the amount of the lubricating oil flowing into the overshot groove 112 and can actively supply the lubricating oil onto the inner peripheral surface 109 of the lower half bearing portion 101. Accordingly, even if the slide bearing 115 increases in size, the amount of the lubricating oil required to be supplied can be made smaller than that for the slide bearing 100.

For the reason described above, in a turbine changing period in an existing plant for the purpose of improving operational performance, it is advantageous for cost reduction and reduction in work period to change the slide bearing 100 to the slide bearing 115 because of usage of the existing oil supply facility such as an oil feeding header without substantive modification or alternation.

In the arrangement described above, however, since the slide bearing 100 and slide bearing 115 are opposite to each other in the positions of the oil supply hole 106 and oil discharge hole 108, routing of pipes connected to the holes 106 and 108 are made complicated and difficult at the time of bearing replacement in an existing plant.

SUMMARY OF THE INVENTION

The present invention was conceived in consideration of the circumstances mentioned above encountered in the prior art and an object of the present invention is to provide a slide bearing which is readily connectable to an oil supply facility and a discharged oil treatment facility and is capable of reducing construction time and cost.

The above and other objects can be achieved according to the present invention by providing, in one aspect of a preferred embodiment, a slide bearing including:

a lower half bearing portion that covers a rotating shaft from a lower side thereof and includes a lower slide surface slidably supporting the rotating shaft;

an upper half bearing portion that covers the rotating shaft from an upper side thereof and includes an upper slide surface slidably supporting the rotating shaft so as to be joined to the lower half bearing portion;

an oil supply passage that is formed in the lower bearing portion and supplies lubricating oil into clearance between an outer peripheral surface of the rotating shaft and the lower slide surface and the upper slide surface; and an oil discharge passage that is formed in the lower half bearing portion and discharges the lubricating oil from the clearance, wherein the oil supply passage has a downstream portion and the oil discharge passage has an upstream portion which are provided at positions on opposite sides of the rotating shaft, and the oil supply passage has an upstream portion extending toward the upstream portion of the oil discharge passage, and the oil discharge passage has a downstream portion extending toward the downstream portion of the oil supply passage.

In another preferred embodiment of the present invention, there is provided a slide bearing including:

a lower half bearing portion that covers a rotating shaft from below and includes a lower slide surface slidably supporting the rotating shaft;

an upper half bearing portion that covers the rotating shaft from above and includes an upper slide surface slidably supporting the rotating shaft so as to be joined to the lower half bearing portion;

an oil supply passage that is formed in the lower bearing portion and supplies lubricating oil into clearance between an outer peripheral surface of the rotating shaft and the lower slide surface and the upper slide surface;

an oil discharge passage that is formed at a position on a side opposite to the oil supply passage of the rotating shaft in the lower half bearing portion and discharges lubricating oil from the clearance; and a piping unit provided with an oil supply piping and an oil discharge piping which are integrated with each other, in which the oil supply piping provided with an oil supply inlet located on a side with the oil discharge passage extending toward the oil supply passage and connectable to the oil supply passage and the oil discharge piping is provided with an oil discharge outlet located on a side with the oil supply passage extending toward the oil discharge passage and connectable to the oil discharge passage.

According to the preferred embodiments of the present invention of the characters mentioned above, the downstream portion of the oil supply passage in the lower half bearing portion and the upstream portion of the oil discharge passage in the lower half bearing portion are provided at the positions on the opposite sides of the rotating shaft. The upstream portion of the oil supply passage extends toward the upstream portion of the oil discharge passage, and the downstream portion of the oil discharge passage extends toward the downstream portion of the oil supply passage.

Accordingly, even if a discharged oil treatment facility is installed in an area outside the slide bearing and on a side with the downstream portion of the oil supply passage, and an oil supply facility is installed in an area on a side with the upstream portion of the oil discharge passage, the oil supply facility can be easily connected to the upstream portion of the oil supply passage, and the discharged oil treatment facility can be easily connected to the downstream portion of the oil discharge passage. This allows easy connection of the slide bearing to the oil supply facility and discharged oil treatment facility, and the construction time and cost can be effectively reduced.

The nature and further characteristic features of the preferred embodiment of the present invention will be made clearer from the following descriptions made with reference to the accompanying drawings.

BRIEF DESCRIPTION OF THE DRAWINGS

In the accompanying drawings:

FIG. 5 shows a slide bearing according to a third embodiment of the present invention, in which

DESCRIPTION OF THE PREFERRED EMBODIMENTS

Embodiments for carrying out the present inventions will be described hereunder with reference to the accompanying drawings. It is to be noted that the present invention is not limited to the described embodiments.

First Embodiment

Figure 1:
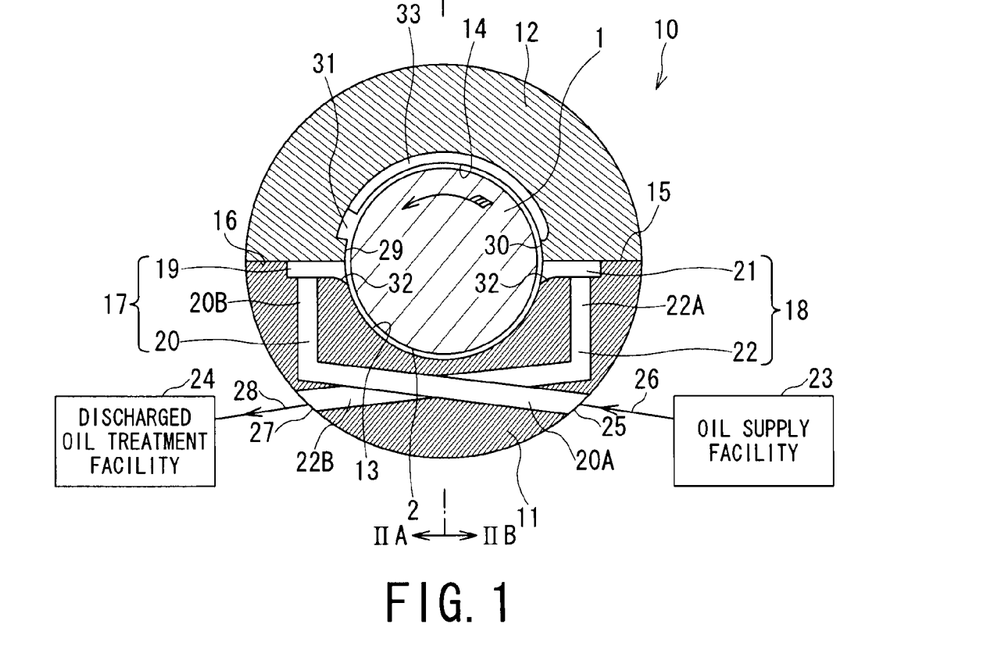
FIG. 1 is a cross-sectional view showing a slide bearing according to a first embodiment of the present invention.
Figure 2A:
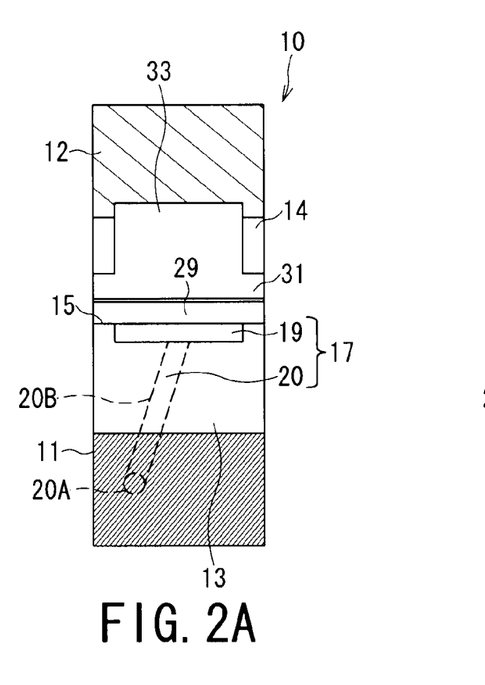
FIGS. 2A and 2B are cross-sectional views taken along the line IIA-IIA and line IIB-IIB in FIG. 1, respectively.
Figure 2B:
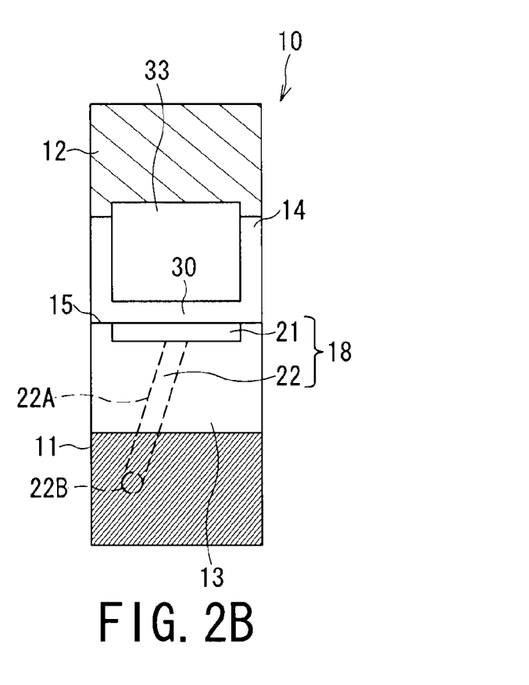

FIG. 1 and FIGS. 2A and 2B

FIG. 1 is a cross-sectional view showing a slide bearing according to a first embodiment of the present invention. A slide bearing 10 shown in FIG. 1 and FIGS. 2A and 2B supports a load of a rotating shaft 1 in a rotating machine such as a steam turbine or a power generator and includes a lower half bearing portion 11 and an upper half bearing portion 12.

The lower half bearing portion 11 covers the rotating shaft 1 from the lower side thereof and includes a lower slide surface 13 which slidably supports the rotating shaft 1.

The upper half bearing portion 12 covers the rotating shaft 1 from above, includes an upper slide surface 14 which slidably supports the rotating shaft 1, and is joined to the lower half bearing portion 11. An upper end face 15 of the lower half bearing portion 11 and a lower end face 16 of the upper half bearing portion 12 which are joined together serve as joined surfaces or split (splittable) surfaces.

An oil supply passage 17 which supplies lubricating oil into clearance or gap between an outer peripheral surface 2 of the rotating shaft 1 and the lower slide surface 13 of the lower half bearing portion 11 and the upper slide surface 14 of the upper half bearing portion 12 and an oil discharge passage 18 which discharges the lubricating oil from the clearance are formed in the lower half bearing portion 11.

The load of the rotating shaft 1 is supported by oil film pressure created in the lubricating oil flowing into the clearance between the outer peripheral surface 2 of the rotating shaft 1 and the lower slide surface 13 and upper slide surface 14 (in particular, the lower slide surface 13).

The oil supply passage 17 includes an oil supply groove 19 and an oil supply hole 20 which communicate with each other. The oil supply hole 20 is composed of an oil supply hole downstream portion 20B communicating with the oil supply groove 19 and an oil supply hole upstream portion 20A continuous to the oil supply hole downstream portion 20B.

The oil supply hole upstream portion 20A functions as an upstream portion of the oil supply passage 17, and the oil supply hole downstream portion 20B and oil supply groove 19 function as a downstream portion of the oil supply passage 17.

The oil discharge passage 18 includes an oil discharge groove 21 and an oil discharge hole 22 which communicate with each other. The oil discharge hole 22 is composed of an oil discharge hole upstream portion 22A communicating with the oil discharge groove 21 and an oil discharge hole downstream portion 22B continuous to the oil discharge hole upstream portion 22A. The oil discharge groove 21 and oil discharge hole upstream portion 22A function as an upstream portion of the oil discharge passage 18, and the oil discharge hole downstream portion 2233 functions as a downstream portion of the oil discharge passage 18.

The oil supply groove 19 and the oil supply hole downstream portion 20B (the downstream portion of the oil supply passage 17) and the oil discharge groove 21 and the oil discharge hole upstream portion 22A (the upstream portion of the oil discharge passage 18) are provided at positions on opposite sides of the rotating shaft 1. Further, the oil supply groove 19 is formed so as to extend in an axial direction of the rotating shaft 1 at a left-hand portion in FIG. 1 of the upper end face 15 of the lower half bearing portion 11. The oil discharge groove 21 is formed so as to extend in the axial direction of the rotating shaft 1 at a right-hand portion in FIG. 1 of the upper end face 15 of the lower half bearing portion 11.

Accordingly, the oil supply groove 19 and the oil discharge groove 21 are provided at positions on the opposite sides of the rotating shaft 1. In an area outside the slide bearing 10, an oil supply facility 23 is installed on the oil discharge groove 21 side, and a discharged oil treatment facility 24 is installed on the oil supply groove 19 side.

The oil supply hole upstream portion 20A (the upstream portion of the oil supply passage 17) extends from the oil supply hole downstream portion 20B toward the oil discharge groove 21 (the upstream portion of the oil discharge passage 18), and an oil supply inlet 25 at a distal end of the oil supply hole upstream portion 20A is connected to the oil supply facility 23 via connecting piping 26. The oil discharge hole downstream portion 22B (the downstream portion of the oil discharge passage 18) extends from the oil discharge hole upstream portion 22A toward the oil supply groove 19 (the downstream portion of the oil supply passage 17), and an oil discharge outlet 27 at a distal end of the oil discharge hole downstream portion 22B is connected to the discharged oil treatment facility 24 via connecting piping 28.

As described above, the oil supply hole upstream portion 20A and the oil discharge hole downstream portion 22B are formed so as to cross each other inside the lower half bearing portion 11. At this time, as shown in FIGS. 2A and 2B, the oil supply hole upstream portion 20A and the oil discharge hole downstream portion 22B are formed at positions different in an axial direction of the lower half bearing portion 11 so as not to interfere with each other to prevent the communicate therebetween. The oil supply hole downstream portion 20B and the oil discharge hole upstream portion 22A corresponding to the oil supply hole upstream portion 20A and the oil discharge hole downstream portion 22B are formed so as to be tilted in opposite directions relative to a vertical direction orthogonal to the axial direction of the lower half bearing portion 11.

The upper slide surface 14 of the upper half bearing portion 12 that does not actively contribute to support of the load of the rotating shaft 1 has an overshot groove 33 formed in a partial area in an axial direction. The overshot groove 33 is a groove which is formed so as to intentionally increase clearance between the outer peripheral surface 2 of the rotating shaft 1 and the upper slide surface 14 of the upper half bearing portion 12 and is intended to reduce friction losses caused by viscosity of the lubricating oil.

Weirs 29 and 30 are further formed so as to protrude at portions on both end sides of the overshot groove 33 in the upper slide surface 14 of the upper half bearing portion 12. Clearance between the weirs 29 and 30 and the outer peripheral surface 2 of the rotating shaft 1 is set to be about 0.1 to 1 mm to be smaller than clearance between a bottom of the overshot groove 33 and the outer peripheral surface 2 of the rotating shaft 1. Because of such arrangement, fluid resistance is produced at surfaces of the weirs 29 and 30, and the amount of the lubricating oil flowing from the oil supply groove 19 and the oil discharge groove 21 into the overshot groove 33 is smaller than a case of no formation of the weirs 29 and 30. Since a required amount or more of the lubricating oil can be prevented from remaining in the overshot groove 33, a reduction in friction losses caused by viscosity of the lubricating oil can be ensured.

Additionally, the lower half bearing portion 11 has a discharge port 31 formed upstream in a rotational direction of the rotating shaft 1 of the weir 29 on the oil supply groove 19 side. The discharge port 31 causes the overshot groove 33 to communicate with an outside of the slide bearing 10. A part of the lubricating oil of high temperature in the overshot groove 33 is stemmed by the weir 29 and is then discharged to outside the slide bearing 10 through the discharge port 31. Accordingly, the temperature of the lubricating oil supplied into clearance between the outer peripheral surface 2 of the rotating shaft 1 and the lower slide surface 13 low can be kept and the reliability of the slide bearing 10 can be improved.

Chamfered surfaces 32 are formed at boundaries between the oil supply groove 19 and oil discharge groove 21 formed in the lower half bearing portion 11 and the lower slide surface 13. The chamfered surfaces 32 make it easier for the lubricating oil in the oil supply groove 19 to flow into clearance between the outer peripheral surface 2 of the rotating shaft 1 and the lower slide surface 13 upon rotation of the rotating shaft 1 and for lubricating oil in the clearance between the outer peripheral surface 2 of the rotating shaft 1 and the lower slide surface 13 to be discharged into the oil discharge groove 21 upon rotation of the rotating shaft 1.

When a rotating machine such as a steam turbine is in operation, the lubricating oil flows from the oil supply facility 23 into the oil supply hole 20 via the connecting piping 26, is supplied to the oil supply groove 19, and spreads in the axial direction of the rotating shaft 1. Thereafter, the lubricating oil flows actively into the clearance between the outer peripheral surface 2 of the rotating shaft 1 and the lower slide surface 13 of the lower half bearing portion 11 upon the rotation of the rotating shaft 1.

The load of the rotating shaft 1 is supported by oil film pressure created in the lubricating oil flowing into the clearance.

A part of the lubricating oil flowing into the clearance between the outer peripheral surface 2 of the rotating shaft 1 and the lower slide surface 13 of the lower half bearing portion 11 flows to the upper slide surface 14 of the upper half bearing portion 12 upon the rotation of the rotating shaft 1. This part of the lubricating oil flows into the overshot groove 33 and is then discharged to the outside through the discharge port 31. Most (a remainder) of the lubricating oil flowing into the clearance between the outer peripheral surface 2 of the rotating shaft 1 and the lower slide surface 13 of the lower half bearing portion 11 flows into the oil discharge hole 22 through the oil discharge groove 21 upon the rotation of the rotating shaft 1. The remainder is discharged to the discharged oil treatment facility 24 via the connecting piping 28.

According to the present embodiment provided with the above-described configuration achieve or attain the following advantageous effects and/or functions (1) and (2).

(1) The downstream portion of the oil supply passage 17 (the oil supply hole downstream portion 20B and the oil supply groove 19) and the upstream portion of the oil discharge passage 18 (the oil discharge groove 21 and the oil discharge hole upstream portion 22A) are provided at positions on opposite sides of the rotating shaft 1 in the lower half bearing portion 11. The upstream portion of the oil supply passage 17 (the oil supply hole upstream portion 20A) extends toward the upstream portion of the oil discharge passage 18 (the oil discharge groove 21 and oil discharge hole upstream portion 22A), and the downstream portion of the oil discharge passage 18 (the oil discharge hole downstream portion 22B) extends toward the downstream portion of the oil supply passage 17 (the oil discharge hole downstream portion 22B and oil supply groove 19).

Accordingly, even if the discharged oil treatment facility 24 is installed in an area outside the slide bearing 10 and on the side of the downstream portion of the oil supply passage 17 (the oil supply hole downstream portion 20B and oil supply groove 19), and the oil supply facility 23 is installed in an area on the side of the upstream portion of the oil discharge passage 18 (the oil discharge groove 21 and oil discharge hole upstream portion 22A), the oil supply facility 23 can be easily connected to the upstream portion of the oil supply passage 17 (the oil supply hole upstream portion 20A), and the discharged oil treatment facility 24 can be easily connected to the downstream portion of the oil discharge passage 18 (the oil discharge hole downstream portion 22B). Therefore, since connection of the slide bearing 10 to the oil supply facility 23 and discharged oil treatment facility 24 can be easily implemented without changing routing of pipes, the time and cost required for the construction can be effectively reduced.

(2) At the upper end face 15 of the lower half bearing portion 11, the oil supply groove 19 of the oil supply passage 17 is formed downstream in the rotational direction of the rotating shaft 1 that rotates in the upper half bearing portion 12, and the oil discharge groove 21 of the oil discharge passage 18 is formed upstream. Additionally, the weirs 29 and 30 are formed at two ends of the upper slide surface 14 of the upper half bearing portion 12. For this reason, the lubricating oil from the oil supply groove 19 is inhibited from flowing into the overshot groove 33 and flows actively into the clearance between the outer peripheral surface 2 of the rotating shaft 1 and the lower slide surface 13 of the lower half bearing portion 11 upon rotation of the rotating shaft 1.

Accordingly, even if the slide bearing 10 increases in size, the amount of the lubricating oil supplied to the slide bearing 10 can be suppressed.

In the present embodiment, the oil supply hole 20 and oil discharge hole 22 are formed to be longer than those in a conventional case, and the diameters of the oil supply hole 20 and oil discharge hole 22 are designed to be large in order to compensate for pressure losses caused by the longer oil supply hole 20 and oil discharge hole 22. In addition, if the oil supply facility 23 is installed on the oil supply groove 19 side, and the discharged oil treatment facility 24 is installed on the oil discharge groove 21 side, it is preferable to adopt the conventional slide bearing 115 such as shown in FIG. 11.

Second Embodiment

Figure 3:
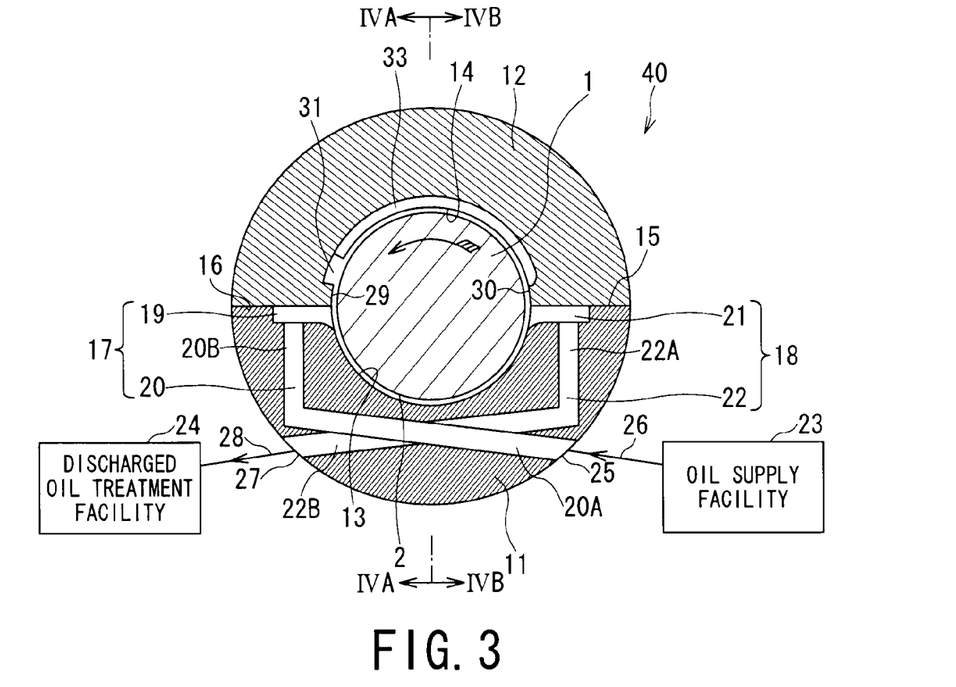
FIG. 3 is a cross-sectional view showing a slide bearing according to a second embodiment of the present invention.
Figure 4A:
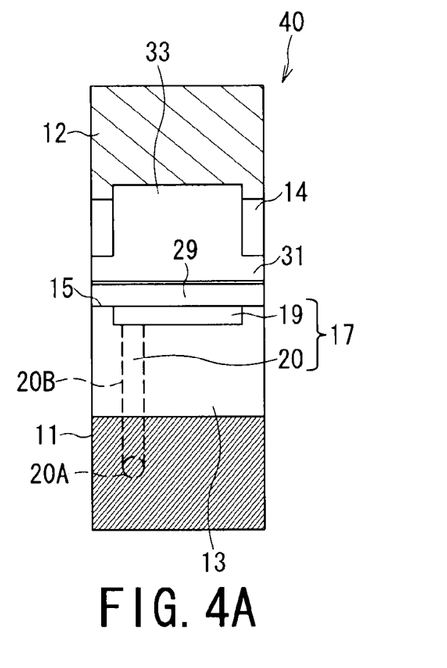
FIGS. 4A and 4B are cross-sectional views taken along the line IVA-IVA and line IVB-IVB in FIG. 3, respectively.
Figure 4B:
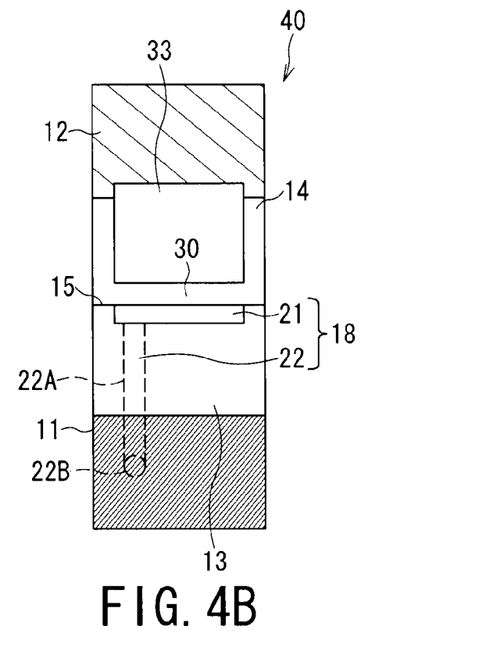

FIGS. 3 and 4A and 4B

FIG. 3 is a cross-sectional view showing a slide bearing according to a second embodiment of the present invention. In the second embodiment, the same portions as those in the first embodiment are denoted by the same reference numerals, and a description thereof will be simplified or omitted.

A slide bearing 40 according to the present second embodiment is different from the slide bearing 10 according to the first embodiment in that an oil supply hole downstream portion 20B of an oil supply passage 17 and an oil discharge hole upstream portion 22A of an oil discharge passage 18 are formed in a vertical direction in a lower half bearing portion 11, as shown in FIG. 3 and FIGS. 4A and 4B. Accordingly, the present embodiment achieves the following advantage (3) in addition to the same advantages as the advantages (1) and (2) of the first embodiment.

(3) Since the oil supply hole downstream portion 20B of the oil supply passage 17 and the oil discharge hole upstream portion 22A of the oil discharge passage 18 are formed in the vertical direction in the lower half bearing portion 11, it is easily work or process the oil supply passage 17 and oil discharge passage 18, and hence, the working or processing cost can be reduced. In addition, the oil supply passage 17 and oil discharge passage 18 can be shortened, and pressure losses in lubricating oil flowing through the oil supply passage 17 and oil discharge passage 18 can be reduced.

Third Embodiment

FIGS. 5A and 5B and FIGS. 6A and 6B

Figure 5A:
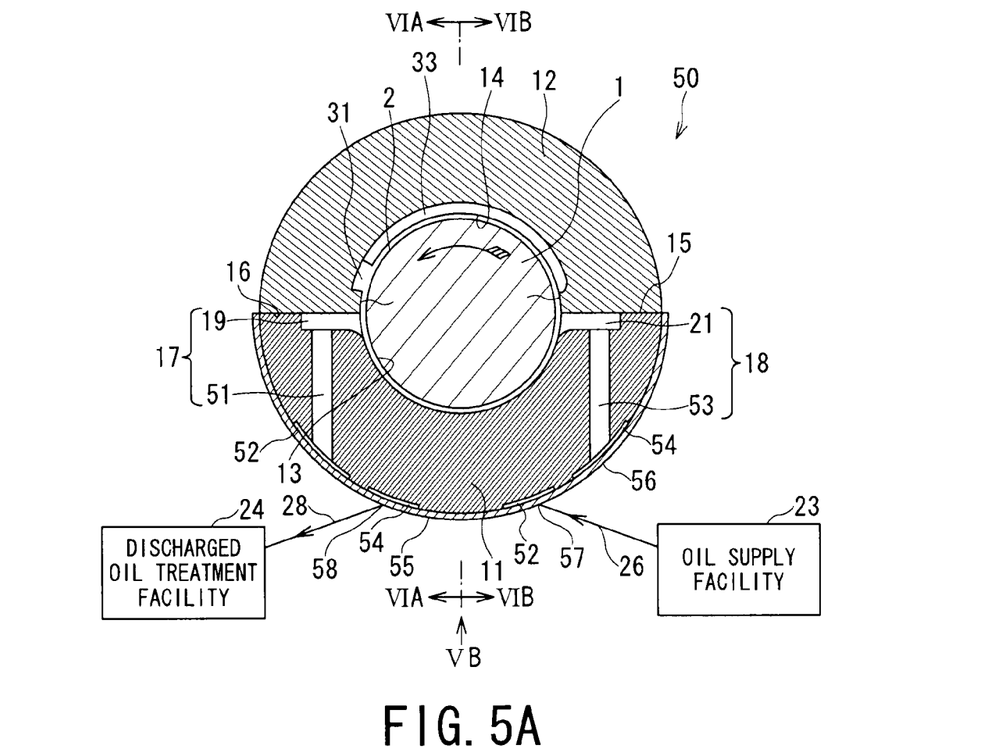
FIG. 5A is a cross-sectional view and FIG. 5B is a view taken in a direction of arrow VB with a cover in FIG. 5A omitted.
Figure 5B:
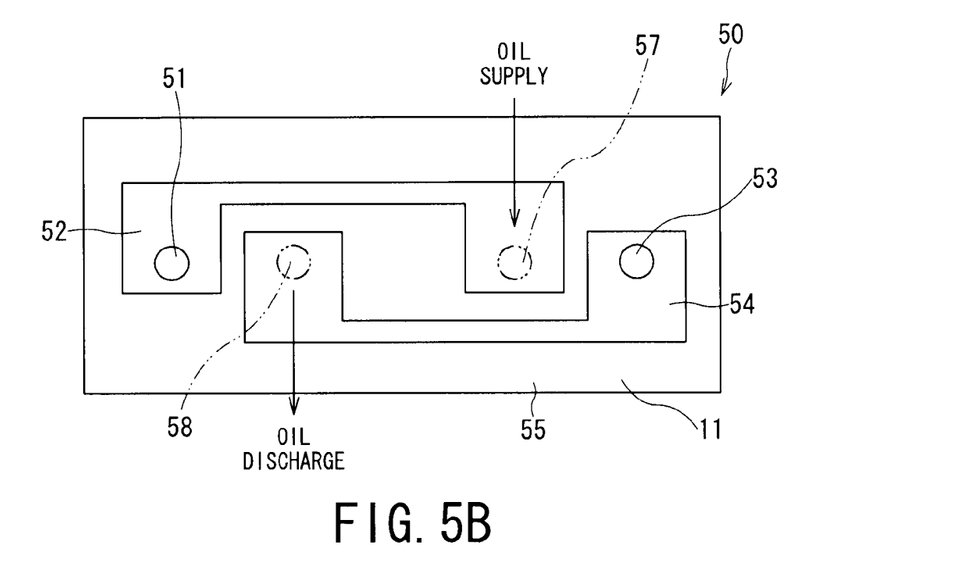
Figure 6A:
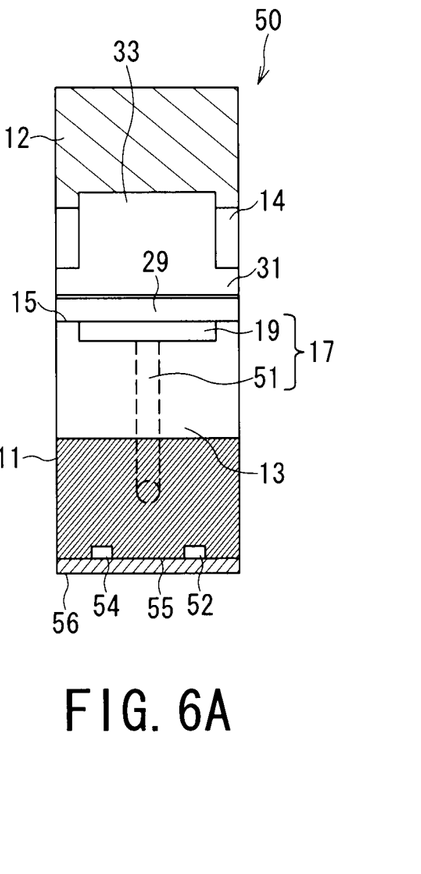
FIGS. 6A and 6B are cross-sectional views taken along the line VIA-VIA and line VIB-VIB in FIG. 5A, respectively.
Figure 6B:
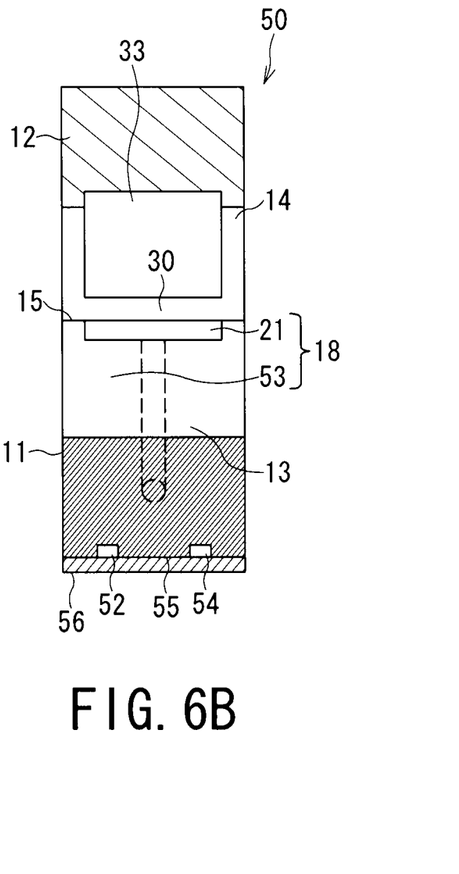

FIGS. 5A and 5B are cross-sectional views showing a bearing according to a third embodiment of the present invention. In the third embodiment, the same portions as those in the first embodiment are denoted by the same reference numerals, and a description thereof will be simplified or omitted.

A slide bearing 50 according to the third embodiment is different from the slide bearing 10 according to the first embodiment in the following points (1) and (2).

(1) An oil supply hole 51 and an oil discharge hole 53 are formed so as to extend from an oil supply groove 19 and an oil discharge groove 21, respectively, in a vertical direction in a lower half bearing portion 11 to reach an outer surface 55 of the lower half bearing portion 11.

(2) An supplied oil introducing groove 52 which communicates with the oil supply hole 51 and a discharged oil discharging groove 54 which communicates with the oil discharge hole 53 are formed in the outer surface 55 of the lower half bearing portion 11, as shown in FIGS. 5A and 5B and 6A and 6B.

As particularly shown in FIG. 5B, the supplied oil introducing groove 52 extends from the oil supply groove 19 side toward the oil discharge groove 21. The discharged oil discharging groove 54 extends from the oil discharge groove 21 side toward the oil supply groove 19 in parallel with the supplied oil introducing groove 52. The supplied oil introducing groove 52 and discharged oil discharging groove 54 are independent of each other.

The supplied oil introducing groove 52 and discharged oil discharging groove 54 are both formed in the outer surface 55 of the lower half bearing portion 11 so as to have predetermined depth and provide a U-shape, respectively, and both are formed as an oil channel by a cover 56 which covers the entire outer surface 55 of the lower half bearing portion 11.

An oil supply inlet 57 which is formed in the cover 56 and communicates with the supplied oil introducing groove 52 is connected to an oil supply facility 23 via connecting piping 26. An oil discharge outlet 58 which is formed in the cover 56 and communicates with the discharged oil discharging groove 54 is connected to a discharged oil treatment facility 24 via connecting piping 28.

In the present third embodiment, the supplied oil introducing groove 52 functions as an upstream portion of an oil supply passage 17, and the oil supply groove 19 and oil supply hole 51 function as a downstream portion of the oil supply passage 17. In addition, the oil discharge groove 21 and oil discharge hole 53 function as an upstream portion of an oil discharge passage 18, and the discharged oil discharging groove 54 functions as a downstream portion of the oil discharge passage 18.

Accordingly, the present embodiment achieves the following advantage (4) in addition to the same advantages as the advantages (1) and (2) of the first embodiment.

(4) The oil supply hole 51 of the oil supply passage 17 and the oil discharge hole 53 of the oil discharge passage 18 are formed in the vertical direction in the lower half bearing portion 11, and the supplied oil introducing groove 52 of the oil supply passage 17 and the discharged oil discharging groove 54 of the oil discharge passage 18 are formed in the outer surface 55 of the lower half bearing portion 11.

Accordingly, the oil supply passage 17 and oil discharge passage 18 can be easily worked or processed with a reduced cost.

Fourth Embodiment

Figure 7:
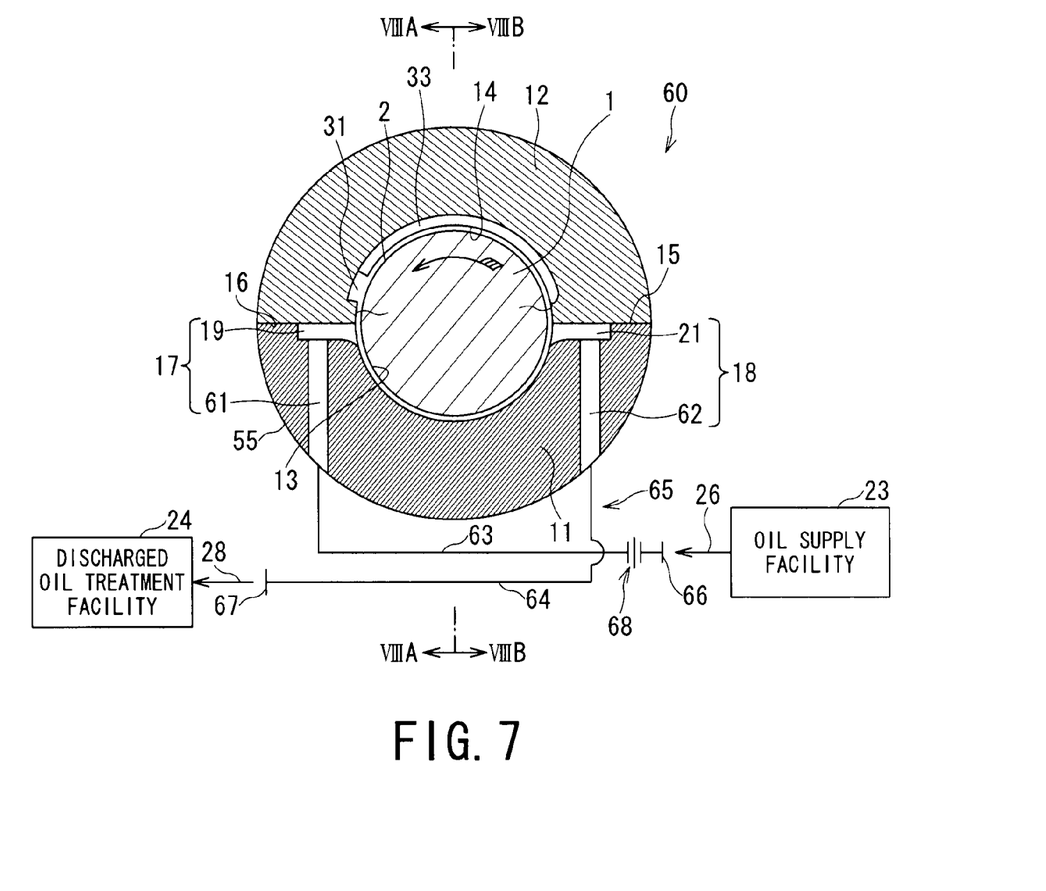
FIG. 7 is a cross-sectional view showing a slide bearing according to a fourth embodiment of the present invention.
Figure 8A:
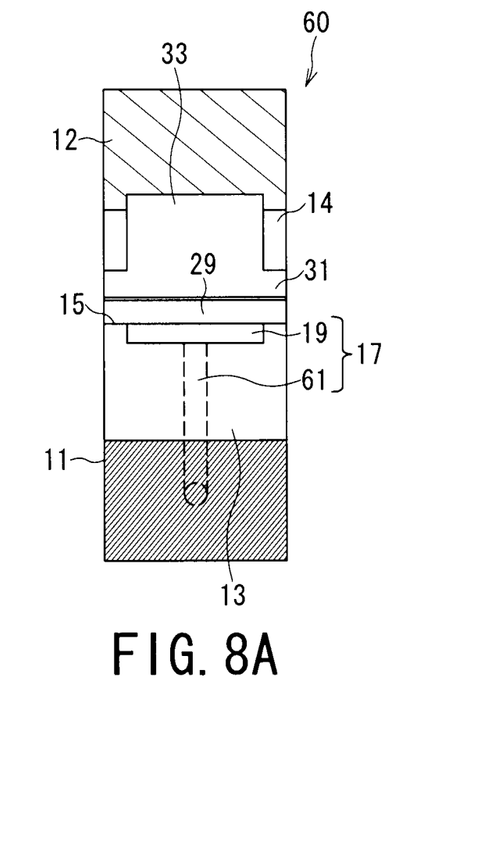
FIGS. 8A and 8B are cross-sectional views taken along the line VIIIA-VIIIA and line VIIIB-VIIIB in FIG. 7, respectively.
Figure 8B:
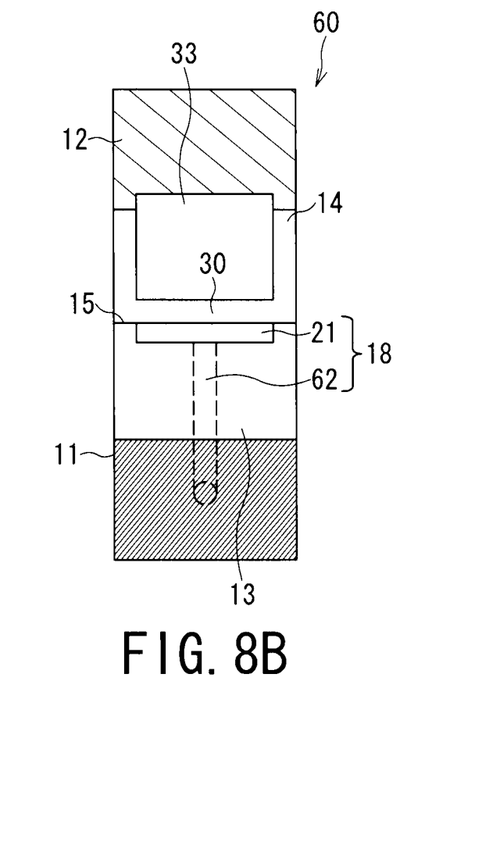

FIG. 7 and FIGS. 8A and 8B

FIG. 7 is a cross-sectional view showing a slide bearing according to a fourth embodiment of the present invention. In the fourth embodiment, the same portions as those in the first and third embodiments are denoted by the same reference numerals, and a description thereof will be simplified or omitted.

A slide bearing 60 according to the fourth embodiment is different from the slide bearing 10 according to the first embodiment in the following points (1) and (2).

(1) An oil supply hole 61 and an oil discharge hole 62 are formed so as to extend from an oil supply groove 19 and an oil discharge groove 21, respectively, in a vertical direction in a lower half bearing portion 11 to reach an outer surface 55 of the lower half bearing portion 11.

(2) The slide bearing 60 further includes a piping unit 65 into which oil supply piping 63 connectable to the oil supply hole 61 and oil discharge piping 64 connectable to the oil discharge hole 62, crossing each other, are integrated, as shown in FIG. 7 and FIGS. 8A and 8B.

In the present fourth embodiment, the oil supply groove 19 and oil supply hole 61 constitute an oil supply passage 17, and the oil discharge groove 21 and oil discharge hole 62 constitute an oil discharge passage 18. The oil supply passage 17 and oil discharge passage 18 are formed at positions on opposite sides of a rotating shaft 1 in the lower half bearing portion 11.

The oil supply piping 63 of the piping unit 65 with an oil supply inlet 66 located on the oil discharge groove side extends toward the oil supply groove 19 and is connectable to the oil supply hole 61 of the oil supply passage 17. The oil supply facility 23 is connected to the oil supply inlet 66 via the connecting piping 26. The oil discharge piping 64 of the piping unit 65 with an oil discharge outlet 67 located on the oil supply groove 19 side extends toward the oil discharge groove 21 and is connectable to the oil discharge hole 62 of the oil discharge passage 18. The discharged oil treatment facility 24 is connected to the oil discharge outlet 67 via the connecting piping 28.

An orifice 68 as a regulating unit capable of regulating the amount of the lubricating oil supplied is further disposed at the oil supply piping 63. Capacity of the oil supply facility 23 has been slightly increased in order to compensate for an increase in pressure losses in the lubricating oil caused by the arrangement of the piping unit 65. However, when the lubricating oil is actually supplied to the slide bearing 60 via the piping unit 65, the amount of the lubricating oil to be supplied needs to be regulated to a necessary and sufficient amount. Because of the above reason, the orifice 68 is disposed.

According to the present fourth embodiment of the configuration described above, the following advantage (5) is achieved in addition to the same advantage as the advantage (2) of the first embodiment.

(5) In the lower half bearing portion 11, the oil supply passage 17 (the oil supply groove 19 and oil supply hole 61) and the oil discharge passage 18 (the oil discharge groove 21 and oil discharge hole 62) are provided at the positions on the opposite sides of the rotating shaft 1. In addition, the oil supply piping 63 of the piping unit 65 with the oil supply inlet 66 located on the oil discharge groove 21 side extends toward the oil supply groove 19, and the oil discharge piping 64 of the piping unit 65 with the oil discharge outlet 67 located on the oil supply groove 19 side extends toward the oil discharge groove 21.

Accordingly, even if the discharged oil treatment facility 24 is installed in an area outside the slide bearing 60 and on the side of the oil supply groove 19 of the oil supply passage 17, and the oil supply facility 23 is installed in an area on the side of the oil discharge groove 21 of the oil discharge passage 18, the oil supply inlet 66 of the oil supply piping 63 in the piping unit 65 can be easily connected to the oil supply facility 23, and in addition, the oil discharge outlet 67 of the oil discharge piping 64 can be easily connected to the discharged oil treatment facility 24. The slide bearing 60 is easily connected to the oil supply facility 23 and discharged oil treatment facility 24 by arranging the piping unit 65, thus the construction time and cost being reduced.

It is further to be noted that although the present invention has been described in the context of the above embodiments, the present invention is not limited to these embodiments, and many changes, and modifications or alternations may be made without departing from the spirit and scope of the invention, and components of different embodiments may be appropriately combined.

What is claimed is:

1. A slide bearing comprising:
    a lower half bearing portion that covers a rotating shaft from a lower side thereof and includes a substantially horizontally extending upper face and a lower slide surface slidably supporting the rotating shaft;
    an upper half bearing portion that covers the rotating shaft from an upper side thereof and includes a substantially horizontally extending lower face and an upper slide surface slidably supporting the rotating shaft, wherein the upper face of the lower half bearing portion and the lower face of the upper half bearing portion are joined to join the lower half bearing portion with the upper half bearing portion, wherein a vertical diametrical line of the rotating shaft is substantially perpendicular to the joined substantially horizontally extending upper and lower faces;

an oil supply passage that is formed in the lower half bearing portion and supplies lubricating oil supplied from an oil supply inlet at a peripheral surface of the lower half bearing portion into a clearance between an outer peripheral surface of the rotating shaft and the lower slide surface and the upper slide surface; and an oil discharge passage that is formed in the lower half bearing portion and discharges the lubricating oil from the clearance to an oil discharge outlet at the peripheral surface of the lower half bearing portion, wherein, within a group of elements consisting of the lower half bearing portion and the upper half bearing portion, the oil supply passage and the oil discharge passage are both provided only in the lower half bearing portion, and wherein the oil supply passage includes a supplied oil introducing groove formed in the peripheral surface of the lower half bearing portion so as to communicate with an oil supply hole, wherein the oil discharge passage includes a discharged oil discharging groove formed in the peripheral surface of the lower half bearing portion so as to communicate with an oil discharge hole, wherein the supplied oil introducing groove extends to the oil supply hole from the oil supply inlet circumferentially spaced from the oil supply hole, wherein the discharged oil discharging groove extends to the oil discharge hole from the oil discharge outlet circumferentially spaced from the oil discharge hole, and wherein the supplied oil introducing groove and the discharged oil discharging groove are each U shaped and are mutually inverted in an axial direction of the rotating shaft.

2. The slide bearing according to claim 1, wherein:

the oil supply passage includes an oil supply groove formed in the substantially horizontally extending upper face of the lower half bearing portion and the oil supply groove is provided so as to extend in the axial direction of the rotating shaft, and the oil discharge passage includes an oil discharge groove formed in the substantially horizontally extending upper face of the lower half bearing portion and the oil discharge groove is provided so as to extend in the axial direction of the rotating shaft.

* * * * *